(12) United States Patent
Garnier et al.

(10) Patent No.: US 9,460,318 B2
(45) Date of Patent: Oct. 4, 2016

(54) MANAGEMENT OF SECURE ELEMENT DEADLOCK

(75) Inventors: Nicolas Garnier, Caen (FR); Xavier Kerdreux, Saint-Contest (FR); Fabien Boitard, Merville Franceville plage (FR)

(73) Assignee: NXP B.V., Eindhoven (NL)

( * ) Notice: Subject to any disclaimer, the term of this patent is extended or adjusted under 35 U.S.C. 154(b) by 295 days.

(21) Appl. No.: 13/424,861

(22) Filed: Mar. 20, 2012

(65) Prior Publication Data
US 2012/0260119 A1   Oct. 11, 2012

(30) Foreign Application Priority Data

Apr. 5, 2011   (EP) .................................... 11290170

(51) Int. Cl.
| | |
|---|---|
| *G06F 21/81* | (2013.01) |
| *G06F 1/30* | (2006.01) |
| *G06F 1/26* | (2006.01) |
| *G06F 1/28* | (2006.01) |
| *G06K 19/07* | (2006.01) |

(52) U.S. Cl.
CPC .............. *G06F 21/81* (2013.01); *G06F 1/266* (2013.01); *G06F 1/28* (2013.01); *G06F 1/30* (2013.01); *G06K 19/0712* (2013.01)

(58) Field of Classification Search
CPC .......... G06F 21/81; G06F 1/28; G06F 1/266; G06F 1/30; G06K 19/0712
USPC .................... 713/300, 340; 307/43; 455/41.1
See application file for complete search history.

(56) References Cited

U.S. PATENT DOCUMENTS

| | | | | |
|---|---|---|---|---|
| 5,212,373 A | * | 5/1993 | Fujioka et al. ................ | 235/492 |
| 5,670,772 A | * | 9/1997 | Goto .............................. | 235/493 |
| 5,736,728 A | * | 4/1998 | Matsubara ..................... | 235/492 |

(Continued)

FOREIGN PATENT DOCUMENTS

| | | |
|---|---|---|
| CN | 101714221 | 5/2010 |
| JP | 2009277122 A | 11/2009 |

OTHER PUBLICATIONS

"Identification ROM V4082", EM Microelectronic—Marin SA, 8 pgs, retrieved from the Internet at: (Sep. 17, 2012) http://pdf1.alldatasheet.com/datasheet-pdf/view/15547/EMMICRO/V4082.html (2004).

Extended European Search Report for application 11290170.7 (Sep. 26, 2012).

(Continued)

*Primary Examiner* — Stefan Stoynov (57) ABSTRACT

Various embodiments relate to an apparatus and associated method for a contactless front-end (CLF) managing a secure element (SE). When the SE receives a low power, a monitoring circuit in the CLF may monitor a power supplied to the SE. Upon detection of an under-voltage condition, the monitoring circuit may cause a management module in the CLF to react to the detected under-voltage condition with an SE management technique. The management module may enact the SE management technique through a separate communications interface connected to the SE. In some embodiments, the CLF may further comprise a register that maintains an under-voltage flag that is triggered when the monitoring circuit detects an under-voltage condition. The management module may reset the under-voltage flag and may use the triggering of the under-voltage flag one or more times to determine whether to react through use of a SE management technique.

19 Claims, 6 Drawing Sheets

(56) References Cited

U.S. PATENT DOCUMENTS

| | | | | |
|---|---|---|---|---|
| 6,070,804 A | * | 6/2000 | Miyamoto | 235/494 |
| 8,583,179 B2 | * | 11/2013 | Rizzo et al. | 455/558 |
| 2005/0184984 A1 | | 8/2005 | Kim | |
| 2006/0214003 A1 | * | 9/2006 | Morrow et al. | 235/487 |
| 2010/0090805 A1 | | 4/2010 | Libotte | |

OTHER PUBLICATIONS

Anderson, "PIC Interrupts—Part 1", XP055106250, http://www.phanderson.com, Aug. 30, 1997; Retrieved from the internet: URL:https://web.archive.org/web20100307055835/http://www.phanderson.com/PIC/16C84/interrupts/interrupt_1.html [retrieved on Mar. 7, 2014].

* cited by examiner

MANAGEMENT OF SECURE ELEMENT DEADLOCK

CROSS-REFERENCE TO RELATED APPLICATIONS

This application claims the priority under 35 U.S.C. §119 of European patent application no. 11290170.7, filed on Apr. 5, 2011, the contents of which are incorporated by reference herein.

FIELD OF THE INVENTION

Various exemplary embodiments disclosed herein relate generally to power management of hardware components.

BACKGROUND OF THE INVENTION

Various electronic devices may include components that are part of a Near-Field Communication (NFC) system. Components of the NFC system may use a short-range wireless protocol for various communications between devices, such as peer-to-peer communications and secured transactions. Various components may be used to enable NFC communications both over the air (OTA) and over the Internet (OTI) through one or more devices, with the devices such as smart cards including components like secure elements (SE), which use Single Wire Protocol (SWP) to enable communication of data to other devices (e.g., card readers or other component connected to a system computer). Some devices are also capable of receiving power for the secure element through the radio frequency (RF) field used to enable data communications.

SUMMARY OF THE INVENTION

In some instances, the power available to supply the one or more secure elements in a particular device may not be sufficient to enable proper functionality. When the secure element receives insufficient power, the secure element may enter a deadlock state, which affects the proper functioning of the secure element for the NFC system.

A brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in the later sections.

Various embodiments may relate to a method comprising monitoring, by a monitoring circuit in a contactless front-end (CLF), a power supply to a secure element (SE) connected to the CLF when the SE is receiving a low power from the CLF; detecting, by the monitoring circuit, an under-voltage condition for the SE, wherein the SE receives power lower than required for operation; and initiating, by a management module in the CLF connected to the monitoring circuit and the SE, a SE management technique, wherein the CLF implements the SE management technique through a communication interface connected to the SE.

Various embodiments may also relate to an apparatus comprising a secure element (SE) that receives a low power; and a contactless front-end (CLF) connected to SE that provides the low power to the SE, the CLF comprising a monitoring circuit that monitors a power supply to the SE when the SE receives a low power from the CLF and detects an under-voltage condition for the SE when the SE receives a power lower than required for operation; and a management module connected to the monitoring circuit and the SE that initiates a SE management technique, wherein the CLF implements the SE management technique through a communication interface connected to the SE.

It should be apparent that, in this manner, various exemplary embodiments enable an apparatus that includes a contactless front-end to control a secure element. Particularly, by monitoring the power supply to the secure element, the contactless front-end may detect a potential under-voltage condition and may enact a configurable management technique through use of the communication connection to the secure element.

BRIEF DESCRIPTION OF THE DRAWINGS

In order to better understand various exemplary embodiments, reference is made to the accompanying drawings wherein.

DETAILED DESCRIPTION OF THE EMBODIMENTS

Referring now to the drawings, in which like numerals refer to like components or steps, there are disclosed broad aspects of various exemplary embodiments.

Figure 1:
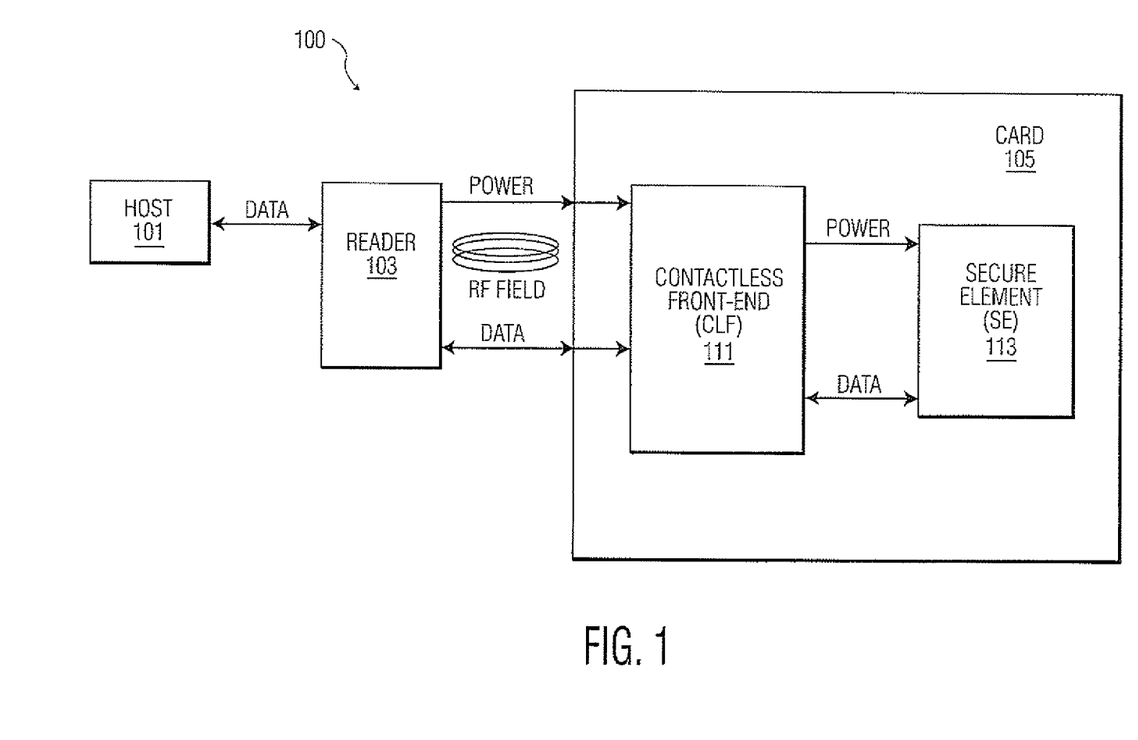
FIG. 1 illustrates an exemplary Near-Field Communication (NFC) system.

FIG. 1 illustrates an exemplary Near-Field Communication (NFC) system. NFC system 100 may include a host 101, a reader 103, and a card 105. Card 105 may include a contactless front-end (CLF) 111 and a secure element 113. NFC system 100 is merely one illustrative embodiment of an NFC system with a secure element; various embodiments include other configurations for the connection of the secure element with one or more other components.

Host 101 may comprise one or more computers that process data received from the secure element 113. Host 101 may provide backbone infrastructure for the reader side of the NFC system 100. For example, the NFC system 100 may enable communication between the host 101 and the secure element 113 for a variety of applications, such as card emulation, wherein the secure element 113 contains secure data for payment (e.g., secured transactions), ticketing, access, traffic (e.g., tolls), and similar transactions between user and system that require secure communications of user data. Similarly, the NFC system 100 may use the secure element 113 for peer-to-peer communication, or the reader side of the NFC system 100 may send information to the card 105. In such instances, the card 105 may act as a reader; such a reader mode may enable functions like service discovery, information access, targeted advertising, and similar applications.

In some embodiments, the NFC system 100 may be implemented so that the card 105 may enable one or more of the above-listed applications based on the type of reader 103. For example, the card 105 may include multiple secure elements 113 that contain secure data regarding a user's credit card information, transit identification, and access information for a workplace. In such an example, the card 105 may be used for secured transactions typically enabled through a credit card, while also using the card 105 for ticketed access to mass transit and for secure access to a workplace. In some embodiments, one secure element 113 may contain secure data for the one or more applications.

Reader 103 may be hardware connected to the host 101 that receives secure data from the secure element 113 in the card 105 and sends information and/or instructions from the host 101 to the secure element 113. Reader 103 may have a wired connection to the host 101, while connecting wirelessly with the card 105. In some embodiments, the reader may also be powered by the host 101. Reader 103 may alternatively be powered independently of the host 101 and the card 105. Reader 103 may communicate wirelessly with the card through the use of various known wireless techniques. For example, in the illustrative embodiment, the reader 103 may use the RF field to enable two-way communications with the card. The RF field may also be used by the reader 103 to transfer power to the card 105. This may enable the secure element to communicate with the reader 103 when the card is operating in a low-power mode.

Card 105 may be a circuit or similar hardware that includes the secure element 113. Card 105 may be an embedded card, such that it cannot be removed without special equipment, or may be a plug-in card (e.g., SIM, SD, micro SD, and similar cards) that may be removed by the user without specialized equipment. In some embodiments, the card 105 may also include the CLF 111 to enable communications between the secure element 113 and the reader 103. Card 105 may be a component of a device, such as a mobile device like a mobile phone that may include other components, such as an application processor and antenna to enable applications within the NFC system 100. The architecture of the card 105 with other components, such as the antenna and application processor, may depend upon the devices that comprise the card 105. For example, in some embodiments, the card 105 may include the secure element 113, the CLF 111, and the antenna. In other embodiments, the card 105 may only comprise the secure element 113; in such instances, the CLF 111 may be a separate component in the mobile device to enable connections with the application processor and the separate antenna.

Contactless Front-End (CLF) 111 may be a circuit in the card 105 or a separate circuit in a mobile device that enables communication between the secure element 113 and the reader 103. In some embodiments, the CLF 111 may be an intermediary interface that connects the secure element 113 to an application processor or an antenna within a mobile device. In some embodiments, the CLF 111 may receive power from at least one of a power management unit (PMU), a battery, or from the field between the reader and the card 105. For example, in the illustrative embodiment, the RF field between the reader 103 and the card 105 may enable two-way communication of data between the card 105 and the reader 103. The RF field may also enable the reader to power the card through the RF field (e.g., through magnetic induction). In such instances, the CLF 111 and/or secure element 113 may receive Power by the Field (PBF). CLF 111 may have connections to the secure element that enable two-way communications between the CLF 111 and the secure element 113.

Secure element (SE) 113 may be hardware in the card 105 that stores and secures data that may be sent through various secure communications through the reader 103 to the host 101. For example, SE 113 may comprise a smart card, such as a Universal Integrated Circuit Card (UICC). In some embodiments, the secure element 113 may be an embedded SE (eSE). In such instances, the eSE 113 may be a component of the card 105 that is a plug-in chip, or may be a component of the card 105 that itself is embedded. Depending on the architecture of the SE 113 in relation to the antenna and/or application processor in the mobile device, the CLF 111 may not need to communicate with the host through the reader. For example, when the eSE 113 is directly connected both to the antenna and to the application processor, the CLF 111 is not necessary to facilitate the powering of the eSE 113 or to facilitate communications between the eSE 113 and other components.

Figure 2A:
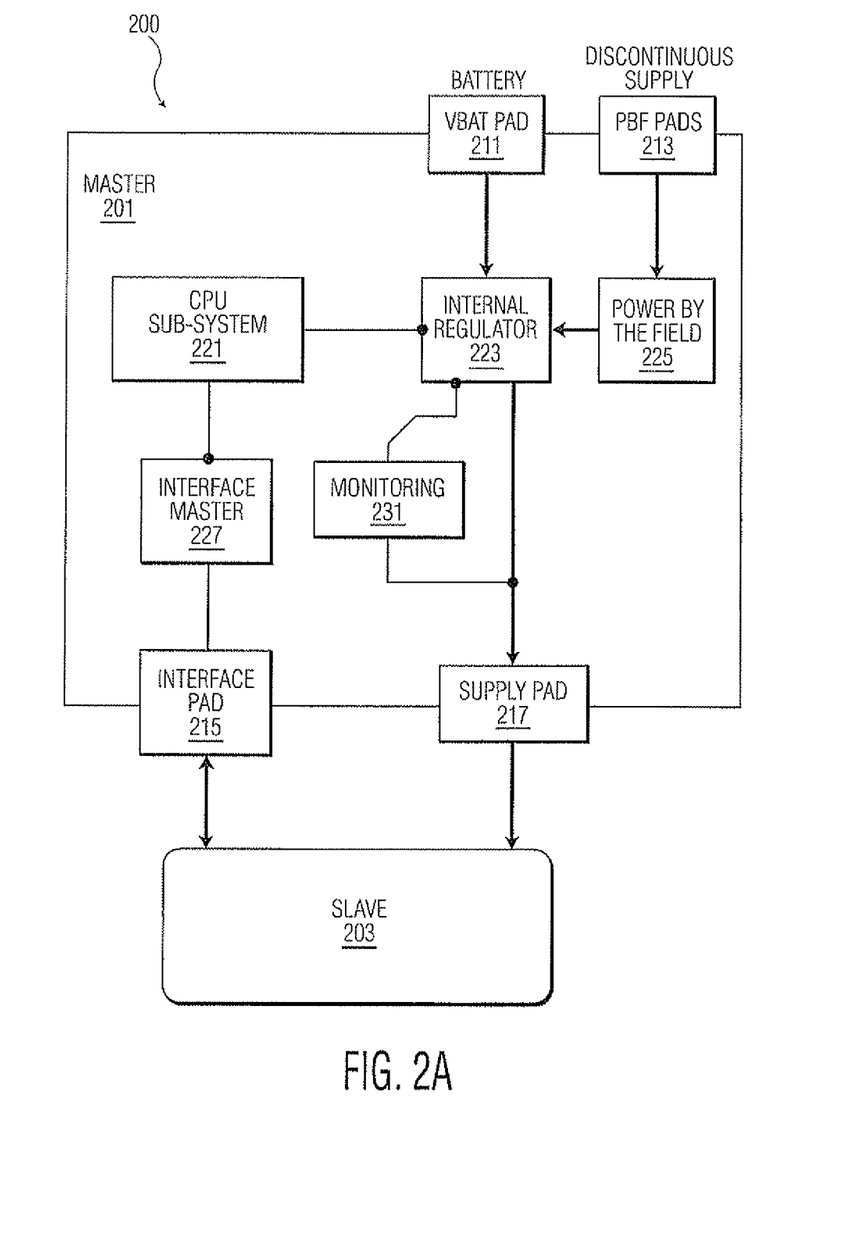
FIG. 2A illustrates an exemplary power supply monitoring and management system.

FIG. 2A illustrates an exemplary power supply monitoring and management system. Power supply monitoring and management system 200 may be similar to an illustrative embodiment of the card 105, which includes a master circuit 201 and a slave circuit 203. In some embodiments, this configuration of the master 201 and the slave 203 may comprise an NFC-SE (Near-Field Communication Secure Element). Master 201 may include a plurality of interfaces, such as a battery (VBAT) pad 211, a power-by-the-field (PBF) pad 213, an interface pad 215, and a supply pad 217. In some embodiments, the master 201 may also include a power management unit (PMU) pad (not shown). Master 201 may also include an internal regulator 223, a PBF block 225, an interface master 227, and a monitoring circuit 231.

Master circuit 201 may be a circuit or similar hardware that controls power and communication with the slave 203. In some embodiments, the master circuit 201 may be a separate circuit, such as the CLF 111 in FIG. 1. Master circuit 201 may maintain separate, independent connections with the slave 203, such as a two-way communication connection between the interface pad 215 and the slave, and a unidirectional power connection from the supply pad 217 to the slave 203. As discussed in relation to the CLF 111, the master circuit 201 may receive power through a number of its interfaces, such as receiving power from a battery through its VBAT pad 211, or receiving power from a discontinuous supply through the PBF pad 213.

Slave 203 may be a circuit or similar hardware that stores secure data for use in an NFC system. For example, in the illustrative embodiment, the slave 203 may comprise a secure element (SE), such as a Universal Integrated Circuit Card (UICC), similar to SE 113 in FIG. 1. The slave 203 may include other hardware and/or software to implement other functions. For example, the slave 203 may also include security and cryptography components, such as a cryptography engine, to encrypt the data before being sent to the interface pad 215 of the master 201.

Slave 203 may also include an internal voltage monitoring circuit or monitoring software to detect an low voltage (LV) condition, which occurs when the slave 203 does not receive enough voltage to function properly. The monitoring component of the slave may also determine a similar condition when it determines that the slave 203 does not have enough power to function properly. When a LV condition occurs, the internal voltage monitoring circuit may cause the slave 203 to reset independent of any commands or communications received from the master 201. In such instances, the master 201 may not be aware that a reset has occurred.

Interfaces 211-217 may be various hardware components within the master 101 that enable connections to components outside the master 201. For example, the VBAT pad 211 and the PBF pad 213 may be interfaces on the master 201 that receive power from an outside source. PBF pad 213 may receive a discontinuous voltage supply from, for example, the antenna that is connected to the reader 103. In some embodiments, the master 201 may also include a PMU (power management unit) pad that receives power from an outside source, such as the power source of a mobile device when in active or high-power mode.

Interface pad 215 may be an interface in the master circuit 201 that allows two-way communications between the master 201 and the slave 203. For example, the pad may receive secure data from the slave 203 using the protocol as specified by the interface master 227 (e.g., single-wire protocol [SWP]). Supply pad 217 may be an interface in the master 201 that enables a supply power to be transferred from the master 201 to the slave 203. Depending on the mode, the supply pad 217 may be connected to the PMU pad (not shown) when a mobile device is active or is in high-power mode, while being connected to the internal regulator 223 when the mobile device is not active or is in low-power mode.

CPU sub-system 221 may be hardware that includes one or more various software modules that may control one or more components in the master 201 and/or slave 203. For example, the CPU sub-system 221 may include a management module that may control the configuration of the master 201 and/or slave 203. In some embodiments, the management module may receive notice of an low voltage (LV) condition that may be occurring at the slave (e.g., secure element) 203 and may respond with a secure-element (SE) management action. Such SE management actions may be implemented by the management module to quickly reestablish communications between the master 201 and the slave 203 and may include, for example, initiating a hard reset of the slave 203, sending a presence check command, or any similar management action. In some embodiments, the specific SE management action chosen may be configured by a user.

CPU sub-system 221 may also communicate with and control other components in the master 201 and other devices, such as the slave 203. CPU sub-system 221 may send messages to the slave 203 that comprise command messages that may change the configuration of the slave 203. For example, the management module in the CPU sub-system 221 may send a hard reset message through interface pad 215, which may cause the slave 203 to immediately reset. Similarly, the CPU sub-system 221 may communicate with and control the internal regulator 123. For example, in some embodiments, the supply voltage produced by the internal regulator 223 may be configured by the user. In such instances, the CPU sub-system may set the default supply voltage sent to the slave 203 through the supply pad 217.

Internal regulator 223 may be hardware and/or software that receives a voltage from at least one of the VBAT pad 211 or the PBF pad 213 and produces a voltage that may be sent to the supply pad 217. In some embodiments, the internal regulator 223 may receive power directly from a power by the Field (PBF) module 225, which may be hardware and/or software that receives a discontinuous supply from the PBF pad 213 and may produce a constant voltage for the internal regulator 223.

In some embodiments, the master 201 may include a slave supply interface that may include a switch that connects either to the output of the internal regulator 223 or to the PMU pad. In such instances, the master 201 may be configured to connect to the internal regulator 223 or the PMU pad based on the mode of the card 105. For example, the slave supply interface may connect to the PMU pad in high-power mode, such as when the card 105 is in a mobile device and the mobile device is active. In contrast, the slave supply interface may connect to the internal regulator 223 when the card 105 is in low-power mode, such as when a mobile device is not active; the internal regulator 223 may receive a supply from the VBAT pad 211 or the PBF pad 213 and may produce a low, constant voltage to power the slave (e.g., 1.8 V). In some embodiments, the CPU sub-system 221 may set a default supply voltage and supply current to power the master 201 and/or the slave 203. For example, the CPU sub-system may set the internal regulator 223 to send a default power of 9 mW to the slave 203 comprising a default supply voltage of 1.8 V and a default current of 5 mA.

In some instances, the power received by the internal regulator 223 may not be sufficient to power both the master 201 and the slave 203. This may occur when the power received by the internal regulator 223 is below the threshold levels for normal operation of both the master 201 and the slave 203. This may also occur when the slave 203 draws too much power from the internal regulator. In such instances, deadlock may result from the insufficient supply power to the internal regulator. A person of skill in the art would be aware of other deadlock conditions. As a result of the deadlock, the slave 203 may no longer properly communicate with the master 201. The management module in the CPU sub-system 221 may then enact a SE management action to overcome the deadlock condition.

Monitoring circuit 231 may be hardware in the slave supply interface in the master 201 that measures the voltage and/or current in the supply line from the internal regulator 223 to the supply pad 217. In some embodiments, the monitoring circuit 231 may compare the power sent to the supply pad 217 with a threshold power associated with powering the slave 203 in low-power mode. When the measured voltage is below the voltage threshold (or the measured current is above the current threshold), the monitoring circuit 231 may determine that an LV condition has occurred. In some embodiments, the management module in the CPU sub-system 221 may respond to the LV condition determination by sending a command to the slave 203 to initiate a hard reset. Such an SE management action may cause the slave 203 to reset and operate under normal conditions, wherein the slave 203 reestablishes communication with the master through the interface pad 215. The management module may be configured by the user to take a different SE management action in response to a determination of a LV condition.

Figure 2B:
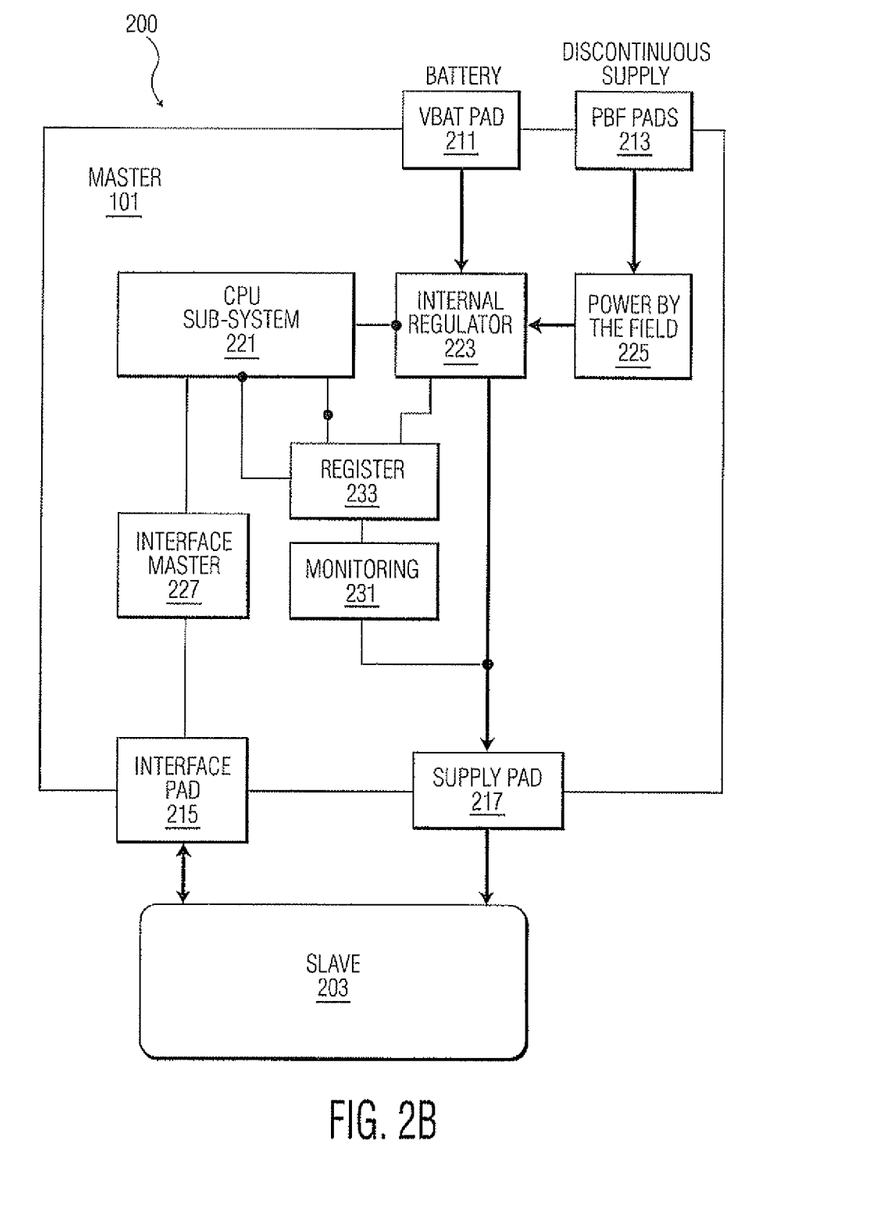
FIG. 2B illustrates another exemplary power supply monitoring and management system.

FIG. 2B illustrates another exemplary power supply monitoring and management system. System 250 is similar to the system 200 in FIG. 2A and similarly includes the components 201-231. Master circuit 201 of the system 250 may also include a register 233 connected to the monitoring circuit 231 in the slave supply interface. Register 233 may be hardware that stores data and may be connected to CPU sub-system 221. In some embodiments, the monitoring circuit 231, upon detecting a potential LV condition may trigger a flag stored in the register. Register 233 may initially store the flag with a default value (e.g., flag=0) that indicates that a potential LV condition has not been detected. When the monitoring circuit 231 detects a potential LV condition in the connection to the supply pad 217, it may trigger the flag (e.g., flag=1), which indicates a potential LV condition. The triggered flag may then be sent to the CPU sub-system 221. In some embodiments, the triggered flag may indicate that the slave 203 may have reset itself. In such instances, the slave 203 may have an internal monitoring circuit that may reset during a detected LV condition. Though the CPU sub-system 221 may not have received any communication about a reset, the LV condition detected by the monitoring circuit 231 may also be the result of the action taken by the slave 203.

The management module in the CPU sub-system 221 may, upon receiving the triggered flag, immediately enact a SE management action; this is similar to the reaction of the management module for system 200. In other embodiments, the management module may take more detailed, alternative action. Such alternative action may be implemented by the management module to identify true LV conditions from occasional glitches that may result in configurations that seem like LV conditions. When taking the more detailed action, the management module may, for example, reset the flag in the register 233 and wait for a tunable period of delay. The tunable period of delay may be configured by the user to, for example, balance speed and accuracy of detection. After the period of the delay, the management module may check the flag stored in the register 233 to determine whether it had been triggered again by the monitoring circuit 231. When the monitoring circuit 231 triggers the flag again within the tunable period, the management module determines that the slave 203 is experiencing a true LV condition and then takes an SE management action; otherwise, the management module may take no further action until it receives another triggered flag.

Figure 3:
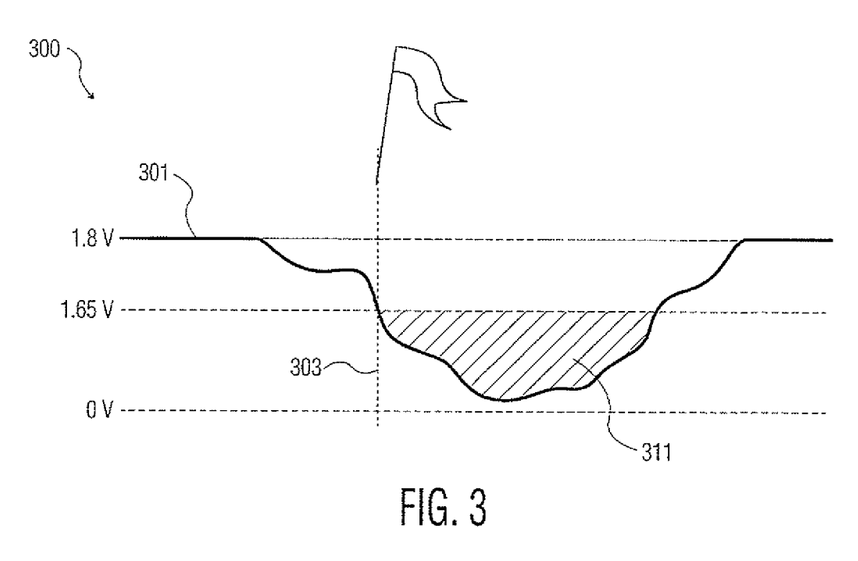
FIG. 3 illustrates an exemplary graph of a supply voltage sent to a slave device over time.

FIG. 3 illustrates an exemplary graph of a supply voltage sent to a slave device over time. Graph 300 illustrates a supply voltage sent to the slave 203 over time. Line 301 illustrates a supply voltage detected by the monitoring circuit 231 as it is received by the supply pad 217. Line 301 initially shows that the supply voltage delivered to the slave 203 is the default supply voltage sent by the internal regulator 223 of 1.8 V. Over time, the supply voltage delivered to the slave 203 lowers until it reaches the threshold voltage of 1.65 V. At time 303, the supply voltage delivered falls below the threshold, resulting in the monitoring circuit 231 triggering the flag in the register 233. In other embodiments, the monitoring circuit 231 may indicate a LV condition directly to the CPU sub-system 221. Until the supply voltage delivered rises above the threshold voltage, the slave 203 may experience an low voltage condition 311. During the LV condition, the slave 203 may be non-responsive due to being non-functional. Alternatively, the slave 203 may be non-responsive due to a hard reset triggered by the slave 203 or by the management module in the CPU sub-system 221.

Figure 4:
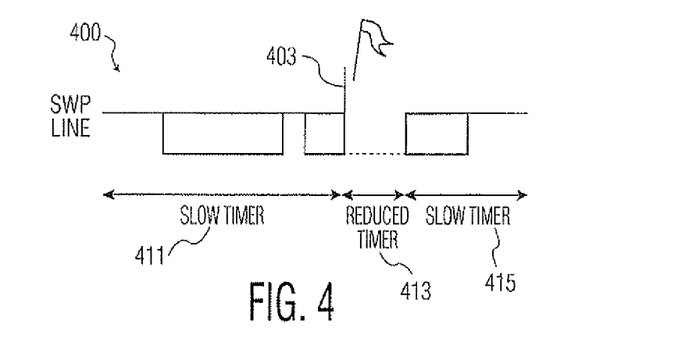
FIG. 4 illustrates an exemplary SE management technique employed by a management module in a master device.

FIG. 4 illustrates an exemplary SE management technique employed by a management module in a master device. Timing diagram 400 may be associated with a "reduced timer" SE management action enacted by the management module in the CPU sub-system 221. When configured to enact the reduced timer SE management action, the CPU sub-system 221 may wait for a shortened period of time between slave resets before attempting to initiate communications with the slave 203 through the interface pad 215.

Line 411 ("slow timer") shows the regular reset period for the slave 203 under regular operation. In some embodiments, the slave 203 may have a long reset period during regular operation based upon the specific device used to comprise the slave 203. CPU sub-system 221 may compensate for the wide range of possible restart times by setting a long default waiting period (e.g., 400 ms) before attempting communication after a timeout. When implementing the reduced timer SE management action in response to the triggered flag 403, the management module in the CPU sub-system 221 may reduce the default wait time to a shorter period (e.g., 10 ms), illustrated as reduced timer 413. After the reduced wait time, the CPU sub-system 221 may reattempt communications with the slave 203. In some embodiments, if communications are not reestablished after the initial attempt after timeout, the CPU sub-system 221 may wait for the shortened period until the slave 203 is functioning properly. Once communications are reestablished, the wait time may be reset to the default setting, as illustrated by line 415.

Figure 5:
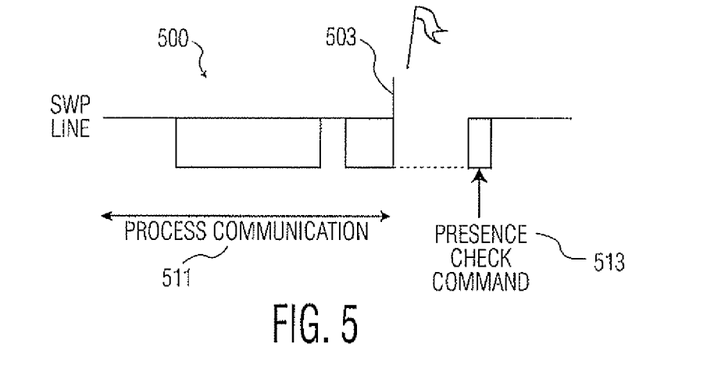
FIG. 5 illustrates another exemplary SE management technique employed by a management module in a master device.

FIG. 5 illustrates another exemplary SE management technique employed by a management module in a master device. Timing diagram 500 may be associated with a "presence check" SE management action enacted by the management module in the CPU sub-system 221. When configured to enact the reduced timer SE management action, the CPU sub-system 221 may attempt determine whether communications with the slave 203 through the interface pad 215 is working regularly. For example, line 511 illustrates regular communications between the master 201 and the slave 203 using the SWP protocol. Upon receiving the triggered flag 503, the management module in the CPU sub-system may attempt to determine whether communications are interrupted (and whether a deadlock condition exists) due to the possible LV condition. In response, the management module may send a presence check command 513 to the slave 203 to determine whether communications are still functioning. In some embodiments, the management module may send the presence check command immediately upon receiving the triggered flag. In alternative embodiments, the management module may wait for a period that is tunable by a user. The management module may periodically resend presence check commands to the slave 203 until communications are successfully reestablished.

Figure 6:
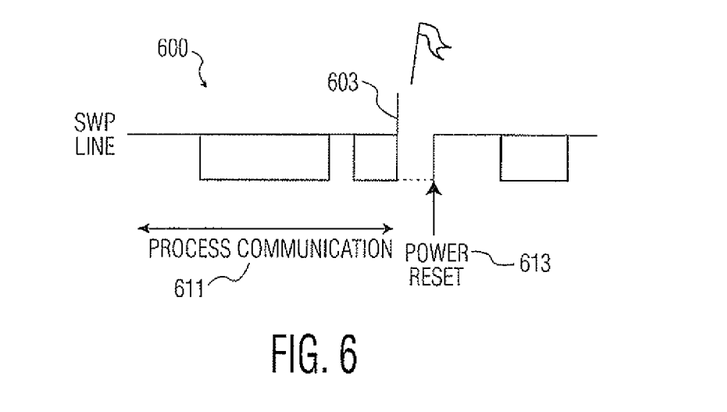
FIG. 6 illustrates another exemplary SE management technique employed by a management module in a master device.

FIG. 6 illustrates another exemplary SE management technique employed by a management module in a master device. Timing diagram 600 may be associated with a power reset SE management action enacted by the management module in the CPU sub-system 221. When configured to enact the reduced timer SE management action, the CPU sub-system 221 sends a reset command to the slave 203 through the interface pad 215. For example, line 611 illustrates regular communications between the master 201 and the slave 203 using SWP protocol. Upon receiving the triggered flag 603, the management module in the CPU sub-system may send a power reset command to the slave 203, which may force the slave 203 to reset (i.e., "hard reset"). In some embodiments, the management module may wait for a tunable period before sending the hard reset command to the slave 203. In some embodiments, the management module may also wait the default wait time after sending the hard reset command to determine whether the slave 203 is functioning properly after being reset.

Figure 7:
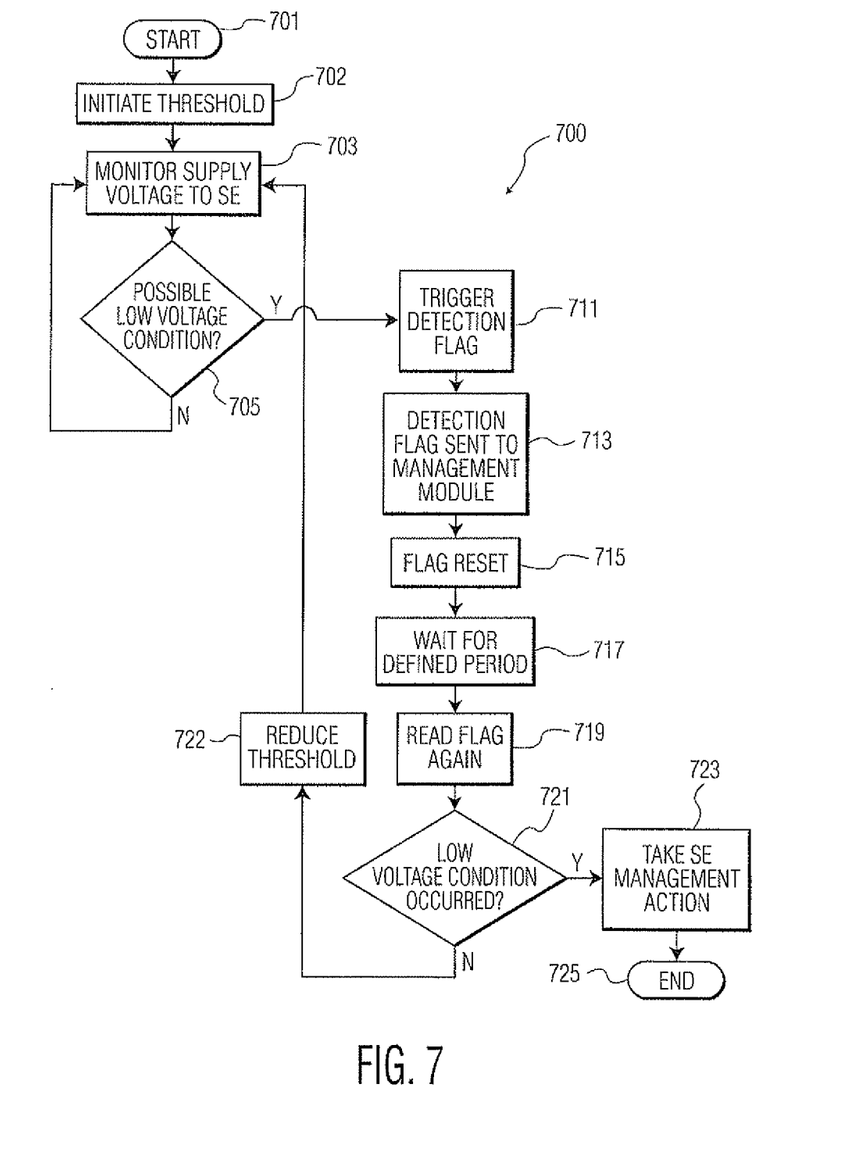
FIG. 7 illustrates an exemplary flowchart employed by a master device for the monitoring and management of a slave device.

FIG. 7 illustrates an exemplary flowchart employed by a master device for the monitoring and management of a slave device. One or more components in the master 201 may implement the method 700 to monitor the slave 203 and to respond to potential deadlock conditions that result from, for example, low voltage to the slave 203. Method 700 may begin at step 701 and proceed to step 702, where a threshold is initiated. Next, in step 703, the monitoring circuit 231 may monitor the supply voltage sent to the supply pad 217. Monitoring circuit 231 may monitor the supply voltage and/or current on the line from the internal voltage 223 to the supply pad 215.

In step 705, the monitoring circuit 231 may determine whether a possible low voltage (LV) condition has been detected based upon the threshold. Monitoring circuit 231 may detect a possible LV condition when the measured quantity passes the applicable threshold and enters a "red zone." For example, when measuring the supply voltage, the monitoring circuit may compare the supply voltage to a threshold of 1.65 V. When the measured supply voltage is below this threshold, the monitoring circuit may proceed to step 711 by triggering a detection flag stored in the register 233. In alternative embodiments, the monitoring circuit may proceed to steps 721 & 723, where the monitoring circuit determines that an LV condition had occurred. In instances where no possible LV condition is detected, the monitoring circuit may loop back to step 703 after reducing the threshold 722. After step 711, the detection flag triggered by the monitoring circuit 231 may be sent from the register 233 to the management module in the CPU sub-system 221. The management module in the CPU sub-system may then in step 715 reset the detection flag in the register 233. In step 717, the management module may wait for a defined period. In some embodiments, the length of the defined period may be configured by the user.

After the defined period, the management module may in step 719 read the status of the flag in the register 233, which was previously reset. When the previously-reset flag was not triggered during the defined period, this may signify that the potential LV condition has not occurred again, which may indicate that there is no deadlock condition. As a result the management module may in step 721 determine that no LV condition occurred and may loop back to step 703 after reducing the threshold 722. Alternatively, when the previously-reset flag was again triggered during the defined waiting period by the monitoring circuit 231, this may indicate that the LV condition that initially triggered the flag still exists. In such instances, the management module may in step 721 determine the LV condition occurred again and may proceed to step 723.

In step 723, the management module may take an SE management action. In some embodiments, the specific SE management action taken may be configured by the user. The SE management action may be communications, commands, or other actions taken by the CPU sub-system 221 to ensure that the slave 203 is functioning properly and to reestablish communications with the slave 203. Once communications with a properly-functioning slave 203 is reestablished, method 700 may end at step 725.

It should be apparent from the foregoing description that various exemplary embodiments of the invention may be implemented in tangible hardware and/or firmware.

Furthermore, various exemplary embodiments may be implemented as non-transitory instructions stored on a tangible machine-readable storage medium, which may be read and executed by at least one processor to perform the operations described in detail herein. A tangible machine-readable storage medium may include any mechanism for storing information in a tangible form readable by a machine, such as a personal or laptop computer, a server, or other computing device. Thus, a tangible machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo-code, and the like represent various processes that may be substantially represented in tangible machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

The invention claimed is:

1. A method comprising:
monitoring, by a monitoring circuit in a contactless front-end (CLF), a power supply to a secure element (SE) connected to the CLF when the SE is receiving a low power from the CLF;
detecting, by the monitoring circuit, a potential under-voltage condition for the SE, wherein the SE receives power lower than required for operation; and
initiating, by a management module in the CLF connected to the monitoring circuit and the SE, a SE management technique, wherein the CLF implements the SE management technique through a communication interface connected to the SE and the SE management technique determines whether the potential under-voltage condition is a true under-voltage condition; and
resending a communication to the SE after a reset waiting period, wherein a duration of the reset waiting period is shorter than a maximum duration for the SE to restart.

2. The method of claim 1, further comprising:
triggering, by the monitoring circuit, an under-voltage flag in a register in the CLF connected to the monitoring circuit and the management module when the potential under-voltage condition is detected;
sending, by the register, the under-voltage flag to the management module;
determining, by the management module, that the under-voltage flag is valid; and
conducting the initiating step when the management module determines that the under-voltage flag is valid.

3. The method of claim 2, wherein the determining step further comprises:
resetting, by the management module, the under-voltage flag in the register;
waiting for a defined period;
loading, by the management module, the reset under-voltage flag after the defined period; and
determining, by the management module, whether the reset under-voltage flag was triggered.

4. The method of claim 3, wherein the defined period is a tunable period.

5. The method of claim 1, further comprising:
receiving, in the SE, the low power from an internal regulator in the CLF.

6. The method of claim 5, further comprising:
receiving, in the internal regulator, power from a battery.

7. The method of claim 5, further comprising:
receiving, in the internal regulator, power from a magnetic field.

8. The method of claim 1, further comprising:
resetting the SE after the true under-voltage condition occurs.

9. The method of claim 1, wherein the SE management technique further comprises:
sending a presence check communication to the SE.

10. The method of claim 1, wherein the SE management technique further comprises:
sending a reset communication to the SE.

11. The method of claim 1, further comprising:
comparing, by the monitoring circuit, a supply voltage to a threshold voltage.

12. The method of claim 11, further comprising:
iteratively reducing, by the monitoring circuit, the threshold voltage.

13. The method of claim 1, wherein the SE management technique is a hard reset.

14. An apparatus comprising:
a secure element (SE) that is configured to receive a low power; and
a contactless front-end (CLF) connected to SE that is configured to provide the low power to the SE, the CLF comprising:
a monitoring circuit that is configured to monitor a power supply to the SE when the SE receives a low power from the CLF and detects a potential under-voltage condition for the SE when the SE receives a power lower than required for operation; and
a management module connected to the monitoring circuit and the SE that is configured to initiate a SE management technique, wherein the CLF implements the SE management technique through a communication interface connected to the SE and the SE management technique determines whether the potential under-voltage condition is a true under-voltage condition and resends a communication to the SE after a reset waiting period, wherein a duration of the reset waiting period is shorter than a maximum duration for the SE to restart.

15. The apparatus of claim 14, wherein the CLF further comprises:
a register connected to the monitoring circuit and the management module that includes an under-voltage flag, wherein the monitoring circuit is configured to trigger the under-voltage flag when the potential under-voltage condition is detected, the register is configured to send the under-voltage flag to the management module, and the management module is configured to implement the SE management technique when it determines that the under-voltage flag is valid.

16. The apparatus of claim 14, the CLF further comprising:
an internal regulator that is configured to supply the lower power to the SE.

17. The apparatus of claim 16, wherein the communication interface comprises a Single Wire Protocol interface.

18. The apparatus of claim 14, wherein the SE comprises a Universal Integrated Circuit Card.

19. A method comprising:
monitoring, by a monitoring circuit in a contactless front-end (CLF), a power supply to a secure element (SE) connected to the CLF when the SE is receiving a low power from the CLF;
detecting, by the monitoring circuit, a potential under-voltage condition for the SE, wherein the SE receives power lower than required for operation; and
initiating, by a management module in the CLF connected to the monitoring circuit and the SE, a SE management technique, wherein the CLF implements the SE management technique through a communication interface connected to the SE, the SE management technique comprises resending a communication to the SE after a reset waiting period, and the duration of the reset waiting period is shorter than the maximum duration for the SE to restart.

* * * * *